United States Patent Office 2,771,790
Patented Nov. 27, 1956

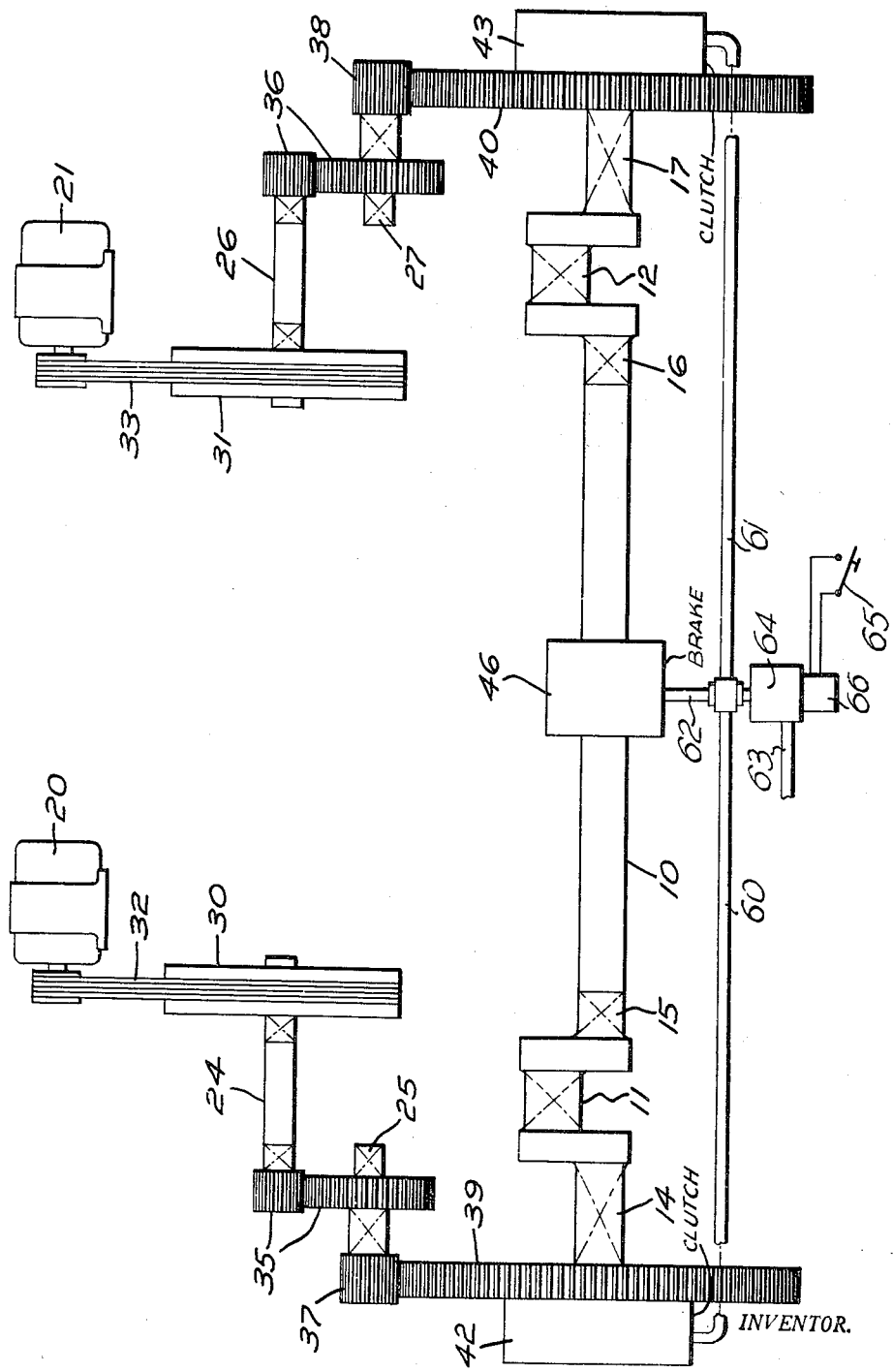

2,771,790
DOUBLE DRIVE POWER PUNCH PRESS

Frederick E. Munschauer, Buffalo, N. Y., assignor to Niagara Machine & Tool Works, Buffalo, N. Y.

Application July 12, 1954, Serial No. 442,848

8 Claims. (Cl. 74—665)

This invention relates to a drive arrangement for power punch presses and similar machines, particularly power punch presses of the double crank type wherein a relatively long final drive shaft is customarily employed.

In power punch presses of the double crank type the final drive shaft is normally provided with a driving crank or similar eccentric device at or near each of its opposite ends. The length of this shaft presents certain design problems, particularly with respect to the torque which develops in the shaft when the loading as against the cranks at the opposite sides thereof is unequal. In the prior art various design expedients have been proposed for driving both ends of such double crank shafts but various practical objections have been necessarily tolerated in drive arrangements of this general type.

The present invention provides a double crank power punch press drive arrangement wherein individual motors are provided, one for driving each end of the double crank shaft, with a separate clutch at each end of the crankshaft, the clutches being under a common or simultaneous control.

It will be noted that with the foregoing arrangement the distance along the crankshaft from the points of torque application to the points where the torque is received and translated by the cranks or eccentrics is a relative short distance at each end of the crankcase. That is, the major torque transmitting portions of the crankshaft comprise only the relatively short lengths thereof which lie between the clutches at each end of the crankshaft and the adjacent cranks. Obviously, with such an arrangement a shaft of smaller diameter may be employed for a given load and a given tolerable torsional or angular deflection than with designs involving longer torque-transmitting shaft portions.

Providing drive means at each end of a power punch press crankshaft is not broadly new but ordinarily this is done by driving the opposite ends of the crankshaft from a common backshaft which in turn receives its driving torque from a single power source, at one point or another along the backshaft. In such arrangements any inequalities in torsional deflection are transmitted back to and through the backshaft from one end of the crankshaft to the other.

In conventional double crank presses with a continuous backshaft geared to both ends of the crankshaft, any inequalities in load distribution or other factors producing unequal deflection of the crankshaft will cause the gear at one end of the crankshaft to be angularly displaced with respect to the gear at the other end. Since the pinions driving these gears are at opposite ends of the same shaft, this torsional displacement produces unqual tooth pressures at the two pinions which throws all or most of the load on one pinion and produces uneven wear. In fact the angular displacement of the crankshaft gears may easily be of such degree as to place a negative or reverse loading on one of the pinions. This condition is eliminated in the drive means of the present invention. The foregoing objectionable condition is peculiar to double crank presses. In a single crank press there is little likelihood of torsional displacement as between the two crankshaft gears. In fact in single crank presses the advantage of employing a separate drive for a gear at each end of the crankshaft is negligible.

Stated in its broadest aspect, then, the present invention comprises a double crank punch press transmission and drive arrangement wherein separate driving motors are provided for each end of the crankshaft, with suitable intermediate transmission and speed-reducing gearing, together with an independent clutch mechanism for each end of the crankshaft acting directly on the crankshaft and thus connecting and disconnecting the crankshaft from the sources of driving torque without connecting and disconnecting or otherwise affecting the intermediate gearing and shafting which operates between the power sources and the ends of the crankshaft. Thus the intermediate drive and speed reducing gearing and shafting operates continuously with the driving motors and is not subject to intermittent starting and stopping with the crankshaft in executing punching strokes.

In the form of the present invention shown herein by way of example a brake is located so as to engage the crankshaft midway between the cranks whereby a fully balanced design is achieved. While a major portion of the length of the crankshaft is involved in the transmission of the brake torque, this load is very much less in degree than the driving load.

While a single embodiment of the principles of the present invention is schematically set forth in the accompanying drawing and described in the following specification, it is to be understood that such embodiment is by way of example only and that the principles of the present invention are limited only as defined in the appended claims.

The single figure of the drawing is a schematic layout of the drive and trnsmission portion of a double crank punch press arranged according to one form of the present invention.

In the drawing the numeral 10 designates a power punch press crankshaft, eccentric shaft or the like which is provided adjacent to its opposite ends with a pair of cranks 11 and 12 which engage, in the usual manner, a pair of connections or connecting rods (not shown) which are arranged to engage and reciprocate the usual power punch press slide or ram. The crankshaft 10 is shown schematically as having journal portions 14, 15, 16 and 17 for being supported in the usual punch press frame bearings.

In the arrangement of the present invention a pair of independent driving motors 20 and 21 are provided, each of which is connected for driving engagement with one end of the crankshaft 10 in a manner which will now be described.

Driving motor 20 connects with the left hand end of crankshaft 10 as viewed in the drawing by way of successive drive and intermediate shafts 24 and 25 and driving motor 21 connects with the right hand end of crankshaft 10 as viewed in the drawing by means of successive drive and intermediate shafts 26 and 27.

Separate flywheels 30 and 31 are mounted on the drive shafts 26 and 26, respectively, in the illustrated instance, and the driving motors 20 and 21 have driving connection with drive shafts 24 and 26, respectively, by means of belt connections 32 and 33 which connect the output shafts of the driving motors 20 and 21 with flywheels 30 and 31, respectively.

Drive and intermediate shafts 24 and 25 are gear connected as at 35 and drive and intermediate shafts 26 and 27 are similarly gear connected as at 36. The intermediate shafts 25 and 27 are provided with drive pinions 37 and 38, respectively, which engage driving gear wheels 39 and 40, respectively, which are arranged coaxially with respect to the crankshaft 10 at the opposite ends thereof.

The gear wheels 39 and 40 are mounted for free rotation on crankshaft 10 and the numerals 42 and 43 designate separate clutch mechanisms which engage between the driving gear wheels 39 and 40, respectively, and crankshaft 10. The clutch means are merely indicated schematically in the drawing since their construction and general type may vary considerably.

As merely one example of a clutch mechanism suitable for use in the present combination, reference may be had to my prior Patent No. 2,428,336, dated September 30, 1947. While that patent illustrates a fluid pressure operated jaw clutch, the clutches 42 and 43 may be of a type embodying frictional clutching surfaces. In any event a common control is provided for activating the clutches 42 and 43 simultaneously, either for engagement thereof or disengagement.

Simultaneous engagement of the clutches 42 and 43 causes the crankshaft 10 to rotate as a unit with the gear wheels 39 and 40. Upon disengagement of the clutches the crankshaft 10 is quickly arrested by a medial brake mechanism 46. The brake mechanism may be of the continuously engaged type commonly employed in the power punch press art or may be correlated with the clutches 42 and 43 to be engaged when the clutches are disengaged and vice versa.

It will be noted that engagement of the clutches 42 and 43 at opposite ends of the crankshaft 10 to set the power punch press in operation activates only the crankshaft 10 itself and the driven parts of the clutches 42 and 43. The driving motors 20 and 21 and the entire gear trains leading to the opposite ends of crankshaft 10, including the independent flywheels 30 and 31 included in such gear trains and the driving parts of the clutches 42 and 43, are all constantly running at all times while the driving motors are in operation, so that the inertia of all of this chain of transmission elements need not be overcome at the beginning and end of each working cycle of operation of the punch press, as in certain prior art transmission arrangements of this general type.

Furthermore, it will be noted that the more or less independent drive mechanisms for each end of the crankshaft 10 are interconnected only through the crankshaft itself and there is therefore no possibility of stresses which are set up across the driving arrangement wherein two ends of a crankshaft are attempted to be driven from a single drive unit.

As stated previously herein, the clutch mechanisms at each end of crankshaft 10 are arranged to engage and disengage simultaneously so that the power of the independent driving motors 20 and 21 is jointly applied to the opposite ends of the crankshaft simultaneously and is likewise simultaneously disconnected therefrom. Various means of achieving simultaneous operation, as by means of common electrical controls and the like, are well known in the art to which the present invention pertains.

If the clutch mechanisms be of the air operated type set forth in the prior Munschauer patent referred to earlier herein, the air pressure conduit will ordinarily be provided with a single control valve, such as a solenoid valve, with branches leading to the air chambers of the two clutch mechanisms beyond such common control valve.

In the drawing the clutches 42 and 43 are of the air operated type and the brake 46 is of the air release type, all as indicated earlier herein and as shown, for instance, in applicant's prior Patent No. 2,722,298. The air conduits for operating the clutches 42 and 43 are designated, respectively, 60 and 61 and the air release conduit for brake 46 is designated 62. These conduits lead from an air supply conduit 63 which is connected to the conduits 60, 61 and 62 by way of a solenoid valve 64 which is opened when the switch 65 is closed to energize the operating solenoid 66 of solenoid valve 64.

What is claimed is:

1. In a power press of the double crank type including a crankshaft having a pair of cranks spaced axially therealong, a pair of independent electric driving motors for applying driving torque to said crankshaft at opposite sides of said cranks, driving wheel means disposed at opposite ends of said crankshaft coaxial therewith and a clutch mechanism acting between each driving wheel means and the associated end of said crankshaft, and similar but independent intermediate transmission and speed reducing gear means acting between each driving motor and each of said clutch mechanisms.

2. In a power press of the double crank type including a crankshaft having a pair of cranks spaced axially therealong, a pair of independent electric driving motors for applying driving torque to said crankshaft at opposite sides of said cranks, driving wheel means disposed at opposite ends of said crankshaft coaxial therewith and a clutch mechanism acting between each driving wheel means and the associated end of said crankshaft, similar but independent intermediate transmission and speed reducing gear means acting between each driving motor and each of said clutch mechanisms, and brake means engageable with said crankshaft medially between said pair of cranks.

3. In a power press of the double crank type including a crankshaft having a pair of cranks spaced axially therealong, a pair of independent electric driving motors for applying driving torque to said crankshaft at opposite sides of said cranks, driving wheel means disposed at opposite ends of said crankshaft coaxial therewith and a pair of clutch mechanisms each including a driving part and a driven part, the driven parts of said clutch mechanism being fixed to opposite ends of said crankshaft and the driving parts being selectively simultaneously engageable and disengageable with respect to the driven parts, and similar but independent intermediate transmission and speed reducing gear means acting between each driving motor and each of said clutch mechanism driving parts.

4. In a power press of the double crank type including a crankshaft having a pair of cranks spaced axially therealong, a pair of independent electric driving motors for applying driving torque to said crankshaft at opposite sides of said cranks, driving wheel means disposed at opposite ends of said crankshaft coaxial therewith and a pair of clutch mechanisms each including a driving part and a driven part, the driven parts of said clutch mechanism being fixed to opposite ends of said crankshaft and the driving parts being selectively simultaneously engageable and disengageable with respect to the driven parts, similar but independent intermediate transmission and speed reducing gear means acting between each driving motor and each of said clutch mechanism driving parts, and brake means engageable with said crankshaft medially between said pair of cranks.

5. In a press, a horizontal crankshaft having a pair of crank elements spaced axially therealong, driving gears on said crankshaft at its opposite ends, separate gear trains each including a pinion in driving engagement with one of the crankshaft driving gears, separate drive motors for the separate gear trains, and separate clutch mechanisms acting between each of said crankshaft driving gears and its associated crankshaft end.

6. In a press, a horizontal crankshaft having a pair of crank elements spaced axially therealong, driving gears on said crankshaft at its opposite ends, separate gear trains each including a pinion in driving engagement with one of the crankshaft driving gears, separate drive motors for the separate gear trains, separate clutch mechanisms acting between each of said crankshaft driving gears and its associated crankshaft end, and brake means engageable with said crankshaft medially of said crank elements.

7. In a press, a horizontal crankshaft having a pair of crank elements spaced axially therealong, driving gears on said crankshaft at its opposite ends, separate gear trains each including a pinion in driving engagement with one of the crankshaft driving gears, separate drive motors for the separate gear trains, a clutch part fixed to each of said driving gears, and a cooperating clutch part fixed to said crankshaft adjacent to each of said driving gears, said clutch parts being simultaneously engageable and disengageable.

8. In a press, a horizontal crankshaft having a pair of crank elements spaced axially therealong, driving gears on said crankshaft at its opposite ends, separate gear trains each including a pinion in driving engagement with one of the crankshaft driving gears, separate drive motors for the separate gear trains, a clutch part fixed to each of said driving gears and a cooperating clutch part fixed to said crankshaft adjacent to each of said driving gears, said clutch parts being simultaneously engageable and disengageable, and brake means engageable with said crankshaft medially of said crank elements.

References Cited in the file of this patent

UNITED STATES PATENTS

| | | |
|---|---|---|
| 1,614,819 | Bauer, et al. | Jan. 18, 1927 |
| 2,366,272 | Le Tourneau | Jan. 2, 1945 |
| 2,577,641 | Wissman | Dec. 4, 1951 |

FOREIGN PATENTS

| | | |
|---|---|---|
| 474,790 | Great Britain | Nov. 8, 1937 |
| 581,508 | Great Britain | Oct. 15, 1946 |